US007958076B2

(12) United States Patent
Bergsten et al.

(10) Patent No.: US 7,958,076 B2
(45) Date of Patent: Jun. 7, 2011

(54) SYSTEM AND METHODS FOR MANAGING RULES AND DETECTING RECIPROCAL DEPENDENCIES

(75) Inventors: Bjorn Bergsten, Southborough, MA (US); Christopher K. McDermott, Westford, MA (US)

(73) Assignee: Stratus Technologies Bermuda Ltd., Hamilton (BM)

( * ) Notice: Subject to any disclaimer, the term of this patent is extended or adjusted under 35 U.S.C. 154(b) by 795 days.

(21) Appl. No.: 11/998,581

(22) Filed: Nov. 30, 2007

(65) Prior Publication Data

US 2009/0144217 A1    Jun. 4, 2009

(51) Int. Cl.
G06F 17/00    (2006.01)
G06N 5/02    (2006.01)

(52) U.S. Cl. ............................ 706/47; 717/117; 718/102

(58) Field of Classification Search .................. 717/117; 718/102
See application file for complete search history.

(56) References Cited

U.S. PATENT DOCUMENTS

| | | | |
|---|---|---|---|
| 4,837,735 A | 6/1989 | Allen, Jr. et al. | 706/10 |
| 4,849,905 A | 7/1989 | Loeb et al. | 706/48 |
| 4,890,240 A | 12/1989 | Loeb et al. | 706/48 |
| 4,953,147 A | 8/1990 | Cobb | 367/35 |
| 5,129,043 A | 7/1992 | Yue | 706/60 |
| 5,150,308 A | 9/1992 | Hooper et al. | 716/18 |
| 5,175,696 A | 12/1992 | Hooper et al. | 716/18 |
| 5,197,116 A | 3/1993 | Katoh et al. | 706/48 |
| 5,226,110 A | 7/1993 | Schwuttke et al. | 706/10 |
| 5,241,652 A | 8/1993 | Barabash et al. | 706/48 |
| 5,263,127 A | 11/1993 | Barabash et al. | 706/48 |
| 5,303,332 A | 4/1994 | Kirk et al. | 706/50 |
| 5,331,579 A | 7/1994 | Maguire, Jr. et al. | 364/578 |
| 5,485,616 A | 1/1996 | Burke et al. | |
| 5,706,452 A | 1/1998 | Ivanov | |
| 5,720,009 A | 2/1998 | Kirk et al. | 706/47 |
| 5,802,508 A | 9/1998 | Morgenstern | |
| 5,890,130 A | 3/1999 | Cox et al. | |
| 5,920,861 A | 7/1999 | Hall et al. | |
| 5,960,404 A | 9/1999 | Chaar et al. | |
| 6,009,405 A | 12/1999 | Leymann et al. | |
| 6,401,111 B1 | 6/2002 | Dan et al. | |
| 6,473,748 B1 | 10/2002 | Archer | |
| 6,631,271 B1 | 10/2003 | Logan | |
| 6,662,172 B1 | 12/2003 | Smith | |
| 6,697,791 B2 | 2/2004 | Hellerstein et al. | 706/47 |

(Continued)

OTHER PUBLICATIONS

PCT International Search Report for International Application No. PCT/US2008/08470, mailed Oct. 14, 2009, 3 pgs.

(Continued)

*Primary Examiner* — Jeffrey A Gaffin
*Assistant Examiner* — Kalpana Bharadwaj
(74) *Attorney, Agent, or Firm* — K&L Gates LLP (57) ABSTRACT

A method of automatically determining firing priority in a plurality of rules. The method includes the steps of determining a level of dependency of each rule; and generating a hierarchy of rules in response to the level of dependency of each rule, wherein the firing priority corresponds to the hierarchy of rules. In another embodiment, the method further includes the step of determining if the hierarchy results in an inconsistency. In another embodiment, the method further comprises the step of determining if the hierarchy results in a loop. In yet another embodiment, the step of determining a level of dependency of each rule is performed in response to an initial event. In one embodiment the method includes the step of determining if there are reciprocal dependencies between any two rules in the set of rules.

19 Claims, 3 Drawing Sheets

U.S. PATENT DOCUMENTS

| | | | |
|---|---|---|---|
| 6,789,054 B1 | 9/2004 | Makhlouf | |
| 6,807,583 B2 | 10/2004 | Hrischuk et al. | |
| 6,952,690 B2 | 10/2005 | Lumpp et al. | 706/47 |
| 6,993,514 B2 | 1/2006 | Majoor | 706/47 |
| 7,051,339 B2 | 5/2006 | Deverill et al. | 719/328 |
| 7,058,826 B2 | 6/2006 | Fung | 713/300 |
| 7,120,559 B1 | 10/2006 | Williams et al. | 702/185 |
| 7,165,105 B2 | 1/2007 | Reiner et al. | |
| 7,203,746 B1 | 4/2007 | Harrop | 709/224 |
| 7,203,881 B1 | 4/2007 | Williams et al. | 714/741 |
| 7,222,302 B2 | 5/2007 | Hauser et al. | |
| 7,428,519 B2 | 9/2008 | Minsky et al. | |
| 7,433,858 B2 | 10/2008 | Rehberg et al. | 706/47 |
| 2003/0191731 A1* | 10/2003 | Stewart et al. | 706/47 |
| 2005/0038764 A1 | 2/2005 | Minsky et al. | 706/47 |
| 2007/0094282 A1* | 4/2007 | Bent | 707/100 |
| 2007/0288280 A1* | 12/2007 | Gilbert et al. | 705/8 |

OTHER PUBLICATIONS

Written Opinion of the International Searching Authority for International Application No. PCT/US2008/08470, mailed Oct. 14, 2009, 5 pgs.

Kuo et al., "The State of the Art in Parallel Production Systems," Journal of Parallel and Distributed Computing, vol. 15, No. 1, 1992, pp. 1-26.

Amaral et al., "Speeding Up Production Systems: From Concurrent Matching to Parallel Rule Firing," Parallel Processing for Artificial Intelligence, Jun. 1994, pp. 1-22.

Oneda et al., Definition of deadlock patterns for business processes workflow models, hicss, vol. 5, p. 5065, Thirty-second Annual Hawaii International Conference on System Sciences—vol. 5, 1999, 12 pp.

* cited by examiner

SYSTEM AND METHODS FOR MANAGING RULES AND DETECTING RECIPROCAL DEPENDENCIES

FIELD OF THE INVENTION

The present invention relates, in general, to rule-based systems. More particularly, the invention relates to systems and methods for determining the priorities of rules in a rule-based system.

BACKGROUND

Expert systems are knowledge based computer applications that simulate decision making process. A typical expert system is made up of a set of rules that are designed to provide solutions to a specific class of problems. One type of rule is composed of an if-clause and a then-clause. The if-clause specifies the condition under which the rule is executed or "fired" and the then-clause specifies the action resulting from the execution of the rule. Accordingly, each rule describes a state of the expert system that requires a particular action.

One type of expert system is a data driven, forward chaining rule-based system that applies the rules of the system to the data in an integrated database, in response to an initial event in the database, until a final decision is reached. Specifically, this type of system reacts to the initial event by searching the system's rule set until it finds a rule that has a true if-clause. The system then executes the then-clause of the rule, updating the data in the database and/or causing other external or internal changes in the system. The process is repeated after each update and the conditions of the rules are re-evaluated until none of the rules has a true if-clause.

The number of rules in rule-based system can range from a few to several thousand, or more, for more complex systems. Sometimes more than one rule in a system may be in condition for execution, (that is, "true") given the state of the database. Further, the order of their execution would significantly affect the output of the system. Therefore, it is imperative in the design of a rule-based expert system to manage rules themselves for the system to function properly. As expert systems become more complex, the number of rules in the systems continues to grow. The increased number of rules translates into more complexity and dependencies between the rules. Consequently, it is becoming more difficult, if not impossible, to resolve rule specific system failures in a sophisticated system.

The present invention addresses this need.

SUMMARY OF THE INVENTION

The present invention provides systems and methods for automatically determining the firing priority in a plurality of rules in a rule based expert system based on the levels of dependency of the rules.

In one aspect of the invention, a method of automatically determining firing priority in a plurality of rules is provided. The method includes the steps of determining a level of dependency of each rule; and generating a hierarchy of rules in response to the level of dependency of each rule, wherein the firing priority corresponds to the hierarchy of rules. In another embodiment, the method further includes the step of determining if the hierarchy results in an inconsistency. In another embodiment, the method further comprises the step of determining if the hierarchy results in a loop. In yet another embodiment, the step of determining a level of dependency of each rule is performed in response to an initial event. In one embodiment the method includes the step of determining if there are reciprocal dependencies between any two rules in the set of rules.

In another aspect, a method of automatically executing a set of rules is provided. The method includes the steps of determining a level of dependency of each rule in the set of rules; and recursively removing the rule with the lowest level of dependency until the set is empty. In another embodiment, rules with the same level of dependency are removed simultaneously. In yet another embodiment, the method further includes the step of determining if there are reciprocal dependencies between any two rules in the set of rules. In yet another embodiment, the method further includes the step of checking consistencies between the rules in the set of rules.

In yet another aspect, a method of automatically executing a set of rules is provided. The method includes the steps of: a) determining a level of dependency of each rule in the set of rules; b) selecting a rule with the lowest dependency from the set of rules; c) firing the rule; d) excluding the rule from the set of rules; and e) repeating steps (b)-(d) until the set of rules is empty. In another embodiment, a method of firing a set of rules in an expert system is provided. The method includes the steps of automatically ranking the rules in the set of rules based on each rule's dependency on other rules; and firing the rules based on their rankings.

In yet another aspect of the invention, a system for automatically determining firing priority in a plurality of rules is provided. The system includes a rule dependency determining module; a rule hierarchy builder in communication with the rule dependency determining module, wherein the rule dependency determining module determines a level of dependency of each rule, wherein the rule hierarchy builder generates a hierarchy of rules in response to the level of dependency of each rule, and wherein the firing priority corresponds to the hierarchy of rules. In another embodiment, the system further includes an inconsistency detection module in communication with the rule hierarchy builder wherein the inconsistency detection module determines if the hierarchy results in an inconsistency. In yet another embodiment, the system further includes a loop detection module in communication with the rule hierarchy builder wherein the loop detection module determines if the hierarchy results in a loop. In yet another embodiment, the system further comprises a memory unit in communication with the rule hierarchy builder wherein the memory unit stores the hierarchy of rules.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

The present invention will be more completely understood through the following detailed description, which should be read in conjunction with the attached drawings. In this description, like numbers refer to similar elements within various embodiments of the present invention. Within this detailed description, the claimed invention will be explained with respect to preferred embodiments. However, the skilled artisan will readily appreciate that the methods and systems described herein are merely exemplary and that variations can be made without departing from the spirit and scope of the invention.

In brief overview, the disclosed invention allows a system with multiple rules, such as an expert system, to automatically determine the execution or firing order of these rules based on a parameter, such as the level of dependencies of each rule. This approach eliminates the need for human intervention, simplifies the design process of the system and, at the same time, significantly improves the reliability and scalability of the system.

As discussed briefly in the background section, the decision making process is specified, in part, by the substantive rules in the system, and also by the execution order of the rules. For example, an exemplary system has the following two rules:

Rule 1: if X=a, then Y=c;
Rule 2: if Y=b and Z=d, then execute an external action, where X, Y, and Z are variables stored in a database integrated with the system and a, b, c and d are numeric values. The initial state of the database in this example is: {X=q, Y=b, Z=e}. The system remains idle in this initial state because neither rule has a true if-clause. When an event in the system updates X to a and Z to d, the conditions of both rules are satisfied and the system should respond by executing the rules. That is updating Y to c and initiating the external action, according to the then-clauses of the rules. This would be the case if both rules are executed at the same time or if Rule 2 is executed before Rule 1. In contrast, if Rule 1 is executed first as a result of the transaction, the database is updated again so that the value of Y becomes c before Rule 2 gets evaluated. Now, the condition of Rule 2, "Y=b", is no longer true after the latest update in the database resulting from the execution of Rule 1 first. Consequently, Rule 2 is not executed and no external action takes place.

The above example illustrates that although the rules and the initial transaction in the database remain the same, the output of the system may be inconsistent depending on the order of execution of the rules. Presumably, in a system where the execution order of rule is determined by a human expert, the expert assigns a higher priority to the first rule so that it is evaluated first before Rule 2. This manual process requires significant human effort when the number of rules in the system is large because generally every group of two rules in the system needs to be compared to determine the correct order of execution.

One embodiment of the present invention solves this problem at compile time by analyzing all dependencies between the rules. If Rule 2 checks the value of Y in its condition and Rule 1 updates Y when executed, then Rule 1, the independent rule, should be evaluated before Rule 2, the dependent rule. In this embodiment, these computed dependencies are exploited to automatically generate a priority number of each rule, which determines the execution or firing order of the rules. As discussed in more detail below, the embodiment of the invention provides a much more efficient and reliable way of determining the priorities of the rules in a rule-based system.

In one embodiment of the invention, a system of automatically determining firing priority in a plurality of rules is provided. The system includes a rule dependency determining module for determining the level of dependency of each rule and a rule hierarchy builder for generating a hierarchy of rules in response to the level of dependency of each rule. The rule dependency determining module is in communication with the rule hierarchy builder and the firing priority is determined based on the hierarchy of rules.

In operation, the rule dependency determining module of the system determines the level of dependency of each rule in the system. By definition, a first rule is dependent on a second rule if the execution of the second rule can potentially determine whether the condition for firing the first rule is satisfied. Referring to the previous example, the execution of Rule 2 depends partially on the value of Y which may be affected by Rule 1, in that, if Rule 1 is executed and the value of Y is updated to c, invalidating the condition of Rule 2 and denying the execution of Rule 2. As such, Rule 2 is dependent of Rule 1.

Multiple levels of rule dependency exist if a first rule depends on a second rule which, in turn, depends on a third rule. In this embodiment, the level of dependency is defined as follows: all independent rules have a level of dependency of zero, rules solely depending on independent rules have a level of dependency of one ("level-1 rule"), rules depending only on the independent rules and the level one rules have a level of dependency of two ("level-2 rule"), and so forth. However, the system for indexing rule dependency can assume any internally consistent format. For example, in the following set of rules:

Rule 1: X=a;
Rule 2: Y=b;
Rule 3: Z=d;
Rule 4: if X=a, then W=e;
Rule 5: if Y=b and W=f, then V=b;
Rule 6: if V=X, then execute an external action, Rules 1, 2 and 3 have a level of dependency of zero. Rule 4 has one level of dependency because it depends on Rule 1, an independent rule, according to the definition of dependency provided above. Rule 5 is a level-2 rule because it depends on at least one level-1 rule, Rule 4. Similarly, Rule 6 is a level-3 rule because it depends on Rule 5, a level-2 rule. In other words, the level of dependency of a particular rule, in this embodiment, is always one plus the level of dependency of the highest level of the rule(s) that it depends upon.

Based on the exemplary definition of rule dependency provided above, software and hardware implementations that determine the level of dependencies of each rule for any finite set of rules in a rule-based expert system are developed. One embodiment of such software iteratively searches for the next level of rules that depends on the previous level of rules, starting with the independent rules in the rule set. Each rule found is assigned a code or rank representing its level of dependency by the program. Other computer algorithms and data structures can also be applied to provide this function. Software implementations may be written in languages that are compatible with a given rule-based system.

Figure 1:
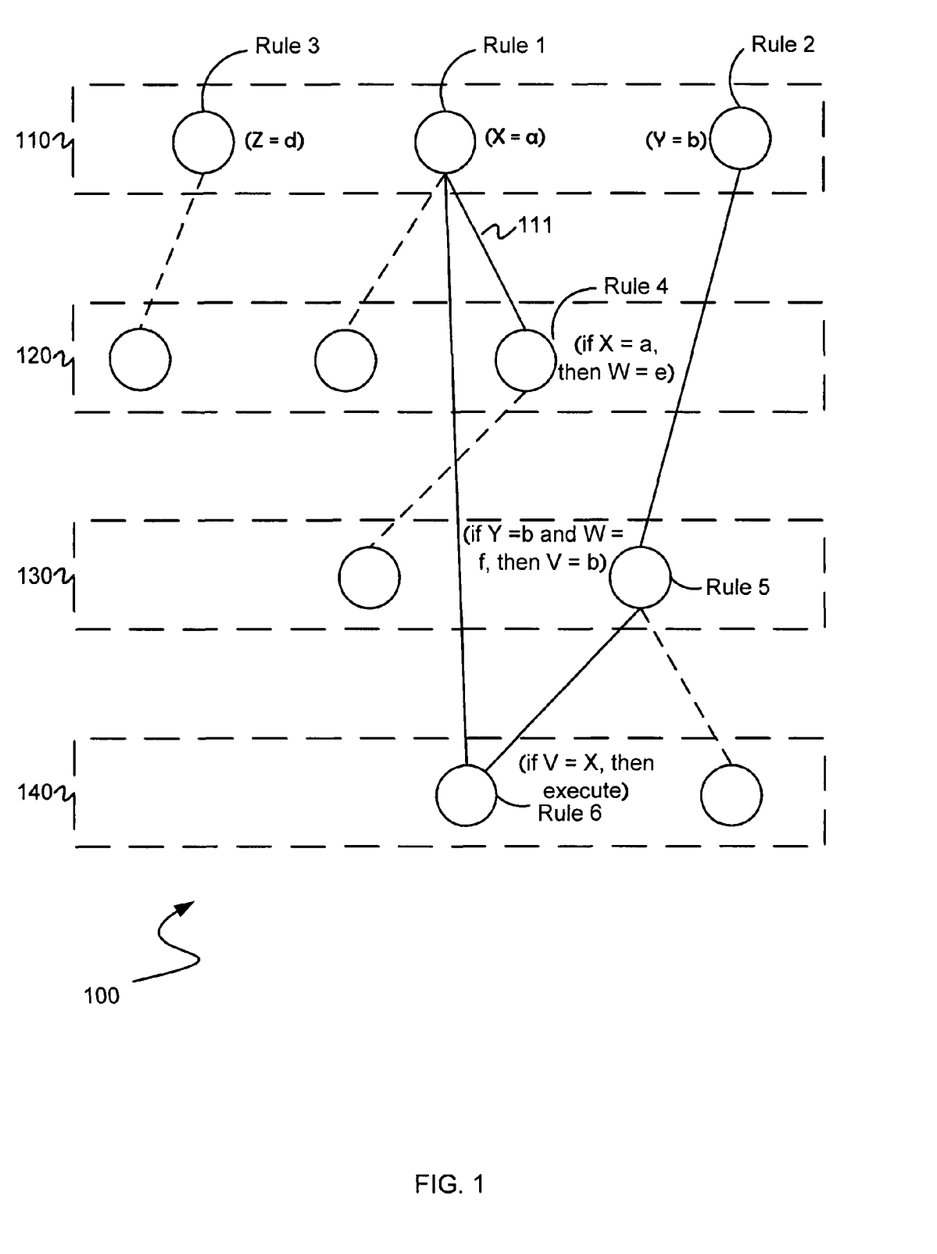
FIG. 1 is a diagram illustrating a hierarchy representing dependencies of rules in a system.

After the level of dependency of each rule is determined, the rule hierarchy builder builds a hierarchy based up on the level of dependency of each rule. In one embodiment, referring to FIG. 1 and Rules 1-6 in the previous example, a tree structure is used to represent the rules and their dependencies in a hierarchy. Each of the nodes of the tree represents a rule. A link 111 between two nodes indicates a dependency between the two respective rules, where the rule at a lower level of the tree depends on the rule at the higher level. Each level of the tree corresponds to a tier 110, 120, 130, 140 of a hierarchy 100. Since each tier includes a number of nodes, each tier 110, 120, 130, 140 of the hierarchy 100 represents a different level of rule dependency. In this example, the independent Rules 1, 2 and 3 are at the top tier of the hierarchy because they have the lowest level of dependency, zero in this example. Rule 4 is a child node of Rule 1 in the tree structure and thus is positioned at the second highest level of the hierarchy. This is because Rule 4 depends upon Rule 1. The dependency is obvious in that the value of W derives from that of X in Rule 4 and the value of X may be affected by Rule 1. Similarly, Rule 5 depends on both Rules 2 and 4 because the condition of Rule 5 checks the value of both variables Y and W, each of which may be respectively affected if Rules 2 and 4 are executed. Since Rule 2 has a level of dependency of zero and Rule 4 has a level of dependency of 1, by the definition of level of dependency provided above, Rule 5 has a level of dependency of 2 and thus is located at level three 130 of the hierarchy 100. Although Rule 6 only verifies one variable, V, in its condition, it is at one level below Rule 5 in the hierarchy because the value of V may be determined by Rule 5. As illustrated, all rules in the expert system are represented in the hierarchy based on their level of dependencies. Rules with the same level of dependency share the same tier in the hierarchy.

Once a hierarchy of the rules is generated by the rule hierarchy builder, the execution order of the rules is mapped to the tiers of the hierarchy. More specifically, the rules at a higher level of the hierarchy are at the top of the execution order and are evaluated before the rules at a lower level of the hierarchy are evaluated. Rules in the same tier may be evaluated simultaneously or in any order because there is no dependency between them. Thus, their relative order of execution does not affect the operation of the system. Simultaneous execution of multiple rules may be carried out using multiple threads of the processor of the system. In the example above, Rules 1, 2 and 3 have the highest priority in the execution order, followed by Rule 4, then Rule 5, and lastly Rule 6, as determined by their respective tier in the hierarchy.

To better illustrate how the rule evaluation process is carried out according to the order determined as discussed above, a step by step description of the system in operation is provided herein. Assuming that the system includes six rules listed above and the initial state of the database is {X=c, Y=d, Z=e, W=f, V=a}, the system dynamically determines the order of evaluation to be 1) Rules 1, 2 and 3; 2) Rule 4; 3) Rule 5; and 4) Rule 6, based on the hierarchy corresponding to the level of dependency of the rules. As determined by the order, Rules 1, 2 and 3 are evaluated first, either serially or in parallel. Since none of these three rules includes an if-clause, each is executed and the state of the database is updated accordingly to: {X=a, Y=b, Z=d, W=f, V=a}. Next, Rule 4 is evaluated. Since, for Rule 4, the condition X=a is true, the system executes the action of the rule and updates W to e. Consequently, Rule 5, which would have fired if evaluated before Rule 4, is not executed because one of its conditions, W=f, is no longer true. As such, the state of the database remains the same after the evaluation of Rule 5. Since both V and X equal to a in the current state of the database, the condition of Rule 6, being evaluated last, is satisfied and the designated external action is triggered by the execution of Rule 6. Again, if the evaluation order of the rules was not predetermined based on the level of dependency of each rule, Rule 5 would have been executed, causing Rule 6 to fail and resulting in a different outcome.

In another embodiment, dependencies between the rules of a system are not determined until a transaction is input to the system. In response to the transaction, the system determines the level of dependency of each rule and compiles a hierarchy based on the level of dependency, as discussed above. The system then evaluates the rules in the order determined based on the hierarchy to generate a solution. In one embodiment, not every rule of the system is in the hierarchy.

Instead, when a user transaction updates the database, the system computes all conditions that are no longer true because of those updates. This generates a list of candidate rules that will be triggered and the system builds a hierarchy including only these rules. The system then executes rules starting from the top tier of the hierarchy as in the method discussed above. After each update in the database as a result of an execution of a rule, all rules that have not been executed, including the ones not initially included in the hierarchy, are re-evaluated. The hierarchy is reconfigured so that the rules corresponding to these conditions are either removed from the hierarchy or added based on the changes in the database. The system iterates this process until the rules in the hierarchy are all executed.

Figure 2A:
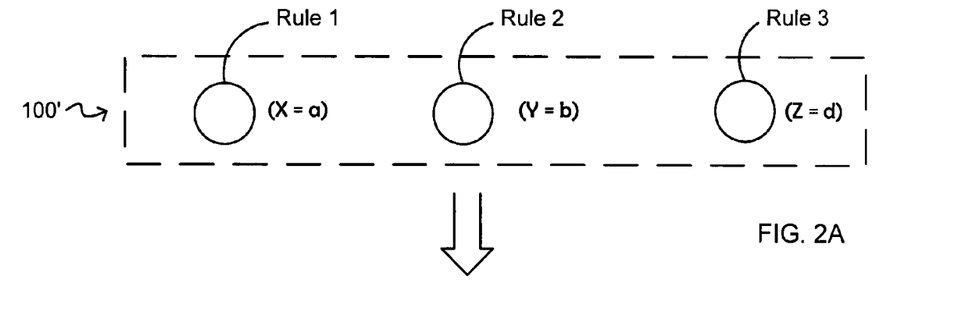
FIGS. 2a, 2b and 2c are block diagrams illustrating the steps in a method of evaluating and executing rules in a system, according to an embodiment of the invention.
Figure 2B:
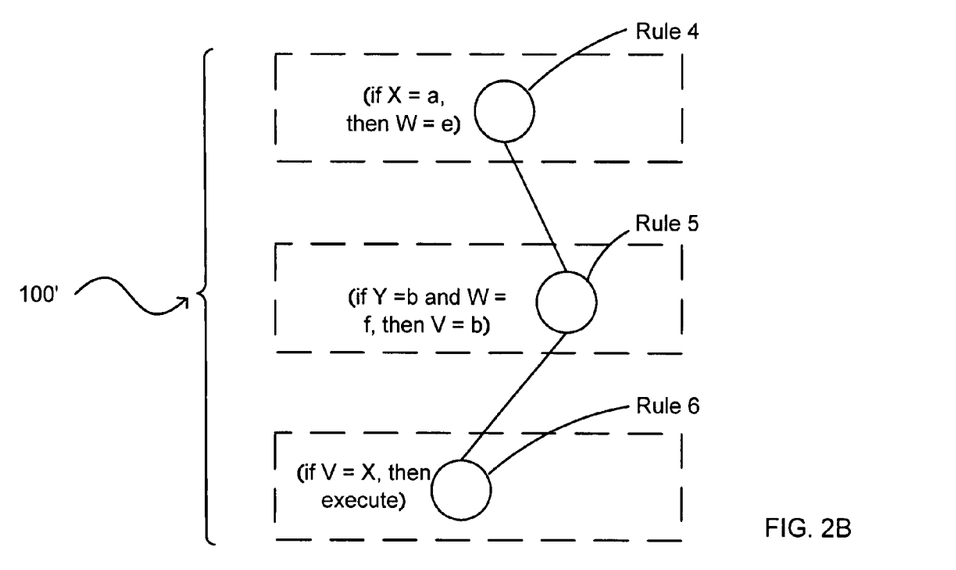
Figure 2C:
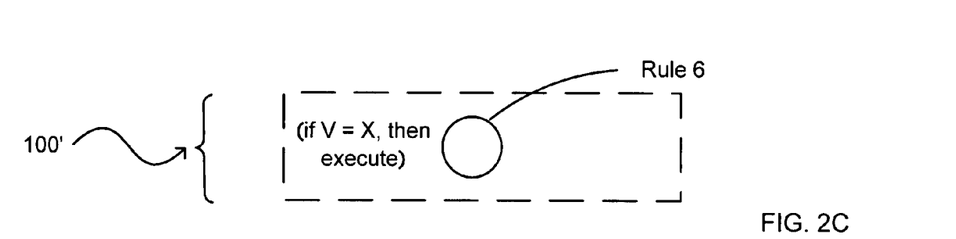

Applying the method of this embodiment to the six rules discussed above, the same outcome is reached albeit through a different process. Instead of building a hierarchy with all six rules, only rules that have true conditions are included in the hierarchy given the initial state of the database: {X=c, Y=d, Z=e, W=f, V=a}. Specifically, Rules 1, 2, and 3 are the only rules in the hierarchy because none of the other rules has a true condition (see FIG. 2*a*). After executing Rules 1, 2 and 3 simultaneously, the system updates the database and re-evaluates the rest of the rules. Since now X=a, Y=b, and Z=d, Rules 4, 5 and 6 all become true. Accordingly, previously executed Rules 1, 2, and 3 are removed from the hierarchy and Rules 4, 5 and 6 added to the different tiers of the hierarchy based on their respective levels of dependencies (see FIG. 2*b*). Rule 4 is executed next because it is now on the top tier of the hierarchy. As the result, the database is in the following state: {X=a, Y=b, Z=d, W=e, V=a}. Repeating the same re-evaluation process, according to this embodiment, Rule 4 is removed as having been executed. Rule 5 is also removed as it is no longer true. Thus, Rule 6 is the only rule left in the hierarchy and it is executed last, producing the same external action as did the other embodiment discussed above.

Independent of the manner in which the hierarchy of rules is generated, if the execution order of the rules is based on the hierarchy and the hierarchy is constructed based on the level of dependency of each rule in the system, the various embodiments of the invention can achieve the same goal of automatically determining firing priority and, at the same time, maintain consistency of the output of the system. The step of generating a hierarchy of rules in response to the level of dependency of each rule in the system can be done by a separate program module of the system in communication with the program that determines the level of dependency of each rule. In one embodiment, both steps can be performed by a single computer program of the system.

In another embodiment of the invention, the system also includes an inconsistency detection module for detecting inconsistencies between the rules and/or a loop detection module for detecting loops in the dependencies of the rules.

A loop exists when two rules are reciprocally dependent of each other, either directly or indirectly, such as in the following example:
  Rule 1: if X=a, then Y=c;
  Rule 2: if Y=c, then Z=b;
  Rule 3: if Z=b, then X=a.
When any of the three rules has a true condition, the expert system will be in a non-terminating computation cycle. It will also be impossible to prioritize the rules using the hierarchical structure representation of dependencies described above. Various methods for detecting loops in rule-based expert systems are well known (see, for example, U.S. Pat. No. 6,952,690) and can be incorporated into embodiments of this invention to prevent failure of the system. The step of detecting loops may be carried out during the process of determining the level of dependency of each rule. Any rules that are a part of a loop may be removed or brought to the attention of the operator of the system so that the system can be debugged.

Other inconsistencies may include rules with the same conditional clause but different action clauses. If the rules have the same level of dependency and are executed simultaneously, the database will return an error when being updated. Such inconsistencies may also be detected and corrected by the system, before the rules are prioritized and executed.

In another embodiment of the invention, a method of automatically executing a set of rules is provided. Similar to the previous embodiments, the level of dependency of each rule is determined and used to generate the firing priority of the rules. The difference is that the method disclosed in this embodiment does not require constructing a hierarchy for the purpose of sorting the rules based on their tier. Instead, this method includes the steps of determining a level of dependency of each rule in the rule set; and recursively removing the rule with the lowest level of dependency until the set is empty. The level of dependency is similarly defined as in the previous embodiments where the independent rules have the lowest level of dependency (zero) and the most dependent rule has the highest level of dependency. A rule is removed only after it has been evaluated, but not necessarily executed.

To illustrate how this method works, it can be applied to the same set of rules used in the discussion of the previous embodiments. Again, the rules are:

Rule 1: X=a;
Rule 2: Y=b;
Rule 3: Z=d;
Rule 4: if X=a; then W=e;
Rule 5: if Y=b and W=f, then V=b;
Rule 6: if V=X, then execute an external action.

As in the previous embodiment, the level of dependency of each rule is determined based on the level of dependency of the highest level of the rule(s) it depends upon. As such, Rules 1, 2 and 3 are level-0 rules, Rule 4 is a level-1 rule, Rule 5 is a level-2 rule, and Rule 6 is a level-3 rule.

Figure 3:
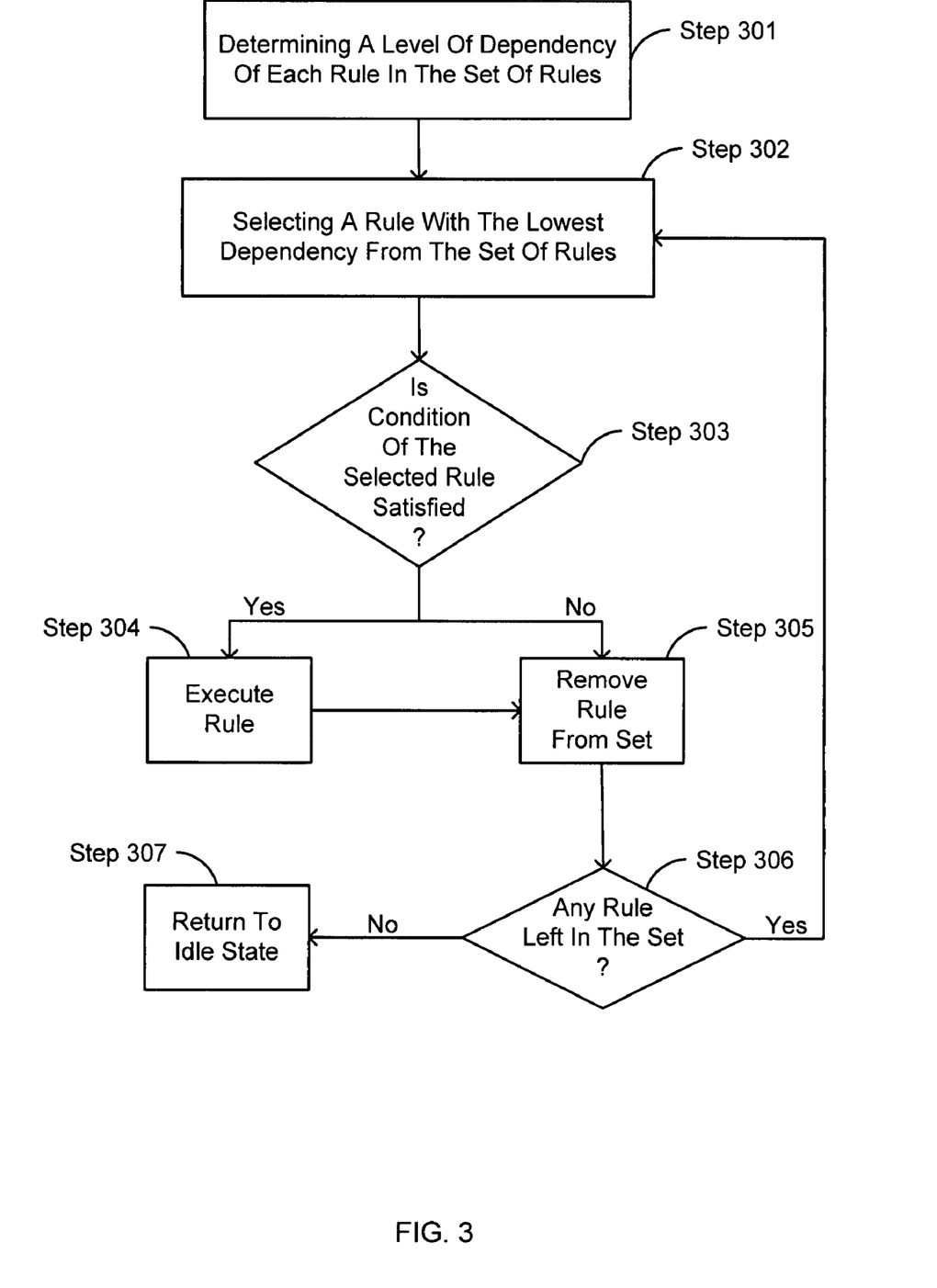
FIG. 3 is a flow chart illustrating the steps in a method of automatically executing a set of rules, according to an embodiment of the invention.

Referring to FIG. 3, according to this embodiment, once the level of dependency of each rule is determined (step 301), the next steps are to recursively remove the rule with the lowest level of dependency until no rule is left. In one embodiment, this removing step is further divided to the following steps: 1) selecting a rule with the lowest dependency from the set of rules (step 302); 2) evaluating the condition of the rule (step 303); and 3) removing the rule (step 305) from the set of rules after either executing the rule (step 304) or bypassing it, depending on the evaluation of the condition of the rule. These steps are repeated in the specified order until all rules are applied and processed.

Using the same initial state of the database {X=c, Y=d, Z=e, W=f, V=a} in this example, a program in the expert system first selects one of Rules 1, 2 or 3, the rules with the lowest dependency of all the rules in the system (step 302). For each of these rules, the program then evaluates their conditions (step 303), and, because these rules are always true, executes each rule (step 304) before removing them from the rule set (step 305). In one embodiment, Rules 1, 2 and 3 are removed simultaneously. In another embodiment, the rules are removed sequentially. Regardless of the order in which they are executed, the database is updated to the following state: {X=a, Y=b, Z=d, W=f, V=a}. After each rule(s) is removed from the set, the program determines whether there are any other rules left in the set (step 306). Since Rules 4, 5 and 6 still remain, the removing step is repeated (steps 302-305).

In the next cycle, Rule 4 is selected (step 302) because it now has the lowest level of dependency relative to Rules 5 and 6. Since the condition of "X=a" is now true, the program executes Rule 4 (step 304) and updates the database so that W is now equal to e. Rule 4 is removed from the rule set after being executed (step 305). With two more rules left in the set, the cycle is repeated first with Rule 5, the rule with the lower level of dependencies of the remaining two rules. However, an evaluation of the condition of Rule 5 returns false (step 303), and Rule 5 is thus removed from the set without having been executed (step 305). After the last rule in the set, Rule 6, is executed and removed from the rule set in the next cycle. The system terminates the recursion and returns to an idle state (step 307).

Variations of the method described above can be implemented using different algorithms, methods, subroutines, software code, and process flows. For example, the above-described process, with reference to FIG. 3 and Rules 1-6, can be implemented in various ways, including the one exemplary pseudocode embodiment that follows.

---

Pseudocode Example for Rules 1-6 and FIG. 3

// iteration 1 in loop:
    // Rules (Rule1, Rule2, Rule3, Rule4, Rule5, Rule6)
\*\*Comment: A set of rules is defined. In this example, the set includes six rules.
    // RuleVariable (<Rule1,X>, <Rule2,Y>, <Rule3,Z>, <Rule4,W>, <Rule5,V>, <Rule6,external action>)
\*\*Comment: Based on the sequential processing of the rules from highest level to lowest level, a pairing of each rule with a new variable or action <r,v> that has not been previously made is generated.
    // VariableRule (<X,Rule4>,<Y,Rule5>,<W,Rule5>,<V,Rule6>,<X,Rule6>)
\*\*Comment: A pairing of each dependent variable with the rule or rules in which it appears is generated.
    // Stratum( ) // empty
\*\*Comment: Terminate the process when there are no more rules to assign a stratum level.
    // S = 1
\*\*Comment: The process of establishing a rule based hierarchy commences with the processing of the highest level rules first and continues through the set of rules until the last rule is processed. This is achieved by eliminating rules in subsequent rounds of iterating the assignment process.
    Phase 1: Do nothing since all variables are updated by rules. That is, there exist a <r,v> for all v.
    Phase 2: Remove <Rule1,X>, <Rule2,Y>,<Rule3,Z> from RuleVariable collection since none of these rules are using variables in their if-clause from

Pseudocode Example for Rules 1-6 and FIG. 3

-continued

```
    the VariableRule collection. Assign Rule1, Rule2 and Rule3 to Stratum 1
    (S=1).
// iteration 2 in loop:
    // Rules (Rule4, Rule5, Rule6)
    // RuleVariable (<Rule4,W>,<Rule5,V>,<Rule6,external action>)
    // VariableRule (<X,Rule4>,<Y,Rule5>,<W,Rule5>,<V,Rule6>,<X,Rule6>)
    // Stratum( ) // empty
    // S = 2
    Phase 1: Remove <X,Rule4>,<Y,Rule5>,<X,Rule6> from the VariableRule
    collection since none of these variables appear in the RuleVariable collection.
    // Rules (Rule4, Rule5, Rule6)
    // RuleVariable (<Rule4,W>,<Rule5,V>,<Rule6,external action>)
    // VariableRule (<W,Rule5>,<V,Rule6>)
    // Stratum( ) // empty
    // S = 2
    Phase 2: Remove <Rule4,W> from the RuleVariable collection since Rule4 is
    not in the VariableRule collection. Assign Rule4 to Stratum 2 (S=2).
// iteration 3 in loop:
    // Rules (Rule5, Rule6)
    // RuleVariable (<Rule5,V>,<Rule6,external action>)
    // VariableRule (<W,Rule5>,<V,Rule6>)
    // Stratum( ) // empty
    // S = 3
    Phase 1: Remove <W,Rule5> from the VariableRule collection since W is not
    in the RuleVariable collection.
    // Rules (Rule5, Rule6)
    // RuleVariable (<Rule5,V>,<Rule6,external action>)
    // VariableRule (<V,Rule6>)
    // Stratum( ) // empty
    // S = 3
    Phase 2: Remove <Rule5,V> from the RuleVariable collection since Rule5 is
    not in the VariableRule collection. Assign Rule5 to Stratum 3 (S=3).
// iteration 4 in loop:
    // Rules (Rule6)
    // RuleVariable (<Rule6,external action>)
    // VariableRule (<V,Rule6>)
    // Stratum( ) // empty
    // S = 4
    Phase 1: Remove <V,Rule6> from the VariableRule collection since V is not
    in the RuleVariable collection.
    // Rules (Rule6)
    // RuleVariable (<Rule6,external action>)
    // VariableRule ( )
    // Stratum( ) // empty
    // S = 4
    Phase 2: Remove <Rule6, external action> from the RuleVariable collection
    since Rule6 is not in the VariableRule collection. Assign Rule6 to Stratum 4
    (S=4).
// iteration 5 in loop:
    // Rules ( )
    // RuleVariable ( )
    // VariableRule ( )
    // Stratum( ) // empty
    // S = 5
    Since no more rules remain in the set of rules, the stratum assignment and
    rule removal process terminates.
```

In this example, the process successfully assigns all rules to a particular stratum. Thus, a hierarchy of rules is assembled for the overall system. Further, each rule r in the set of rules has an assigned stratum number which can be sorted to determine the execution order of the rules.

This embodiment provides a dynamic way of determining the evaluation and execution order of the rules in the rule set. A computer program to implement and incorporate this method in existing rule-based systems or as a part of new systems can be implemented in many languages. Such a program may also include loop checking module that checks for loops among the rules of the system and consistency checking module that detects any inconsistencies resulting from the execution of the rules. In various embodiments, the program and modules may be compiled in real time in response to an external event or precompiled and stored in the memory of the system.

Variations, modification, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

The invention claimed is:

1. A computer-implemented method of automatically executing a set of rules, the method comprising the steps of:
   determining if there are reciprocal dependencies between any two rules in the set of rules in a rule based expert system;
   determining a level of dependency of each rule in the set of rules in the rule based expert system; recursively removing the rule with the lowest level of dependency until the set is empty in the rule based expert system; and determining a firing priority for the set of rules using the rule based expert system.

2. The computer-implemented method of claim 1 wherein a plurality of rules with the same level of dependency are removed simultaneously.

3. The computer-implemented method of claim 1 further comprising the step of checking consistencies between the rules in the set of rules.

4. The computer-implemented method of claim 1 wherein the step of determining is performed in response to an initial event.

5. A system for automatically executing a set of rules, the system comprising:
 a processor;
 means for determining if there are reciprocal dependencies between any two rules in the set of rules in a rule based expert system;
 means for determining a level of dependency of each rule in the set of rules in the rule based expert system; and
 means for recursively removing the rule with the lowest level of dependency until the set is empty in the rule based expert system,
 wherein the means for determining a level of dependency of each rule is in communication with the means for recursively removing the rule with the lowest level of dependency, wherein the processor determines a firing priority for the set of rules in the rule based expert system.

6. The system of claim 5 further comprising means for checking consistencies between the rules in the set of rules.

7. The system of claim 5 further comprising means for storing the level of dependency of each rule.

8. A system for automatically executing a set of rules, the system comprising:
 a processor;
 a rule dependency determining module in a rule based expert system;
 a loop checking module in communication with the rule dependency determining module wherein the loop checking module determines if there are reciprocal dependencies between any two rules in the set of rules in the rule based expert system; and
 a rule firing module in communication with the rule dependency determining module in the rule based expert system,
 wherein the rule dependency determining module determines a level of dependency of each rule in the set of rules, and
 wherein the rule firing module recursively removes the rule with the lowest level of dependency until the set is empty, wherein the processor determines a firing priority for the set of rules in the rule based expert system.

9. The system of claim 8 further comprising a consistency checking module in communication with the rule dependency determining module wherein the consistency checking module for checking consistencies between the rules in the set of rules.

10. The system of claim 8 further comprising a memory unit in communication with the rule dependency determining module wherein the memory unit stores the level of dependency of each rule.

11. A computer-implemented method of automatically executing a set of rules, the method comprising the steps of:
 a) determining if there are reciprocal dependencies between any two rules in the set of rules in a rule based expert system;
 b) determining a level of dependency of each rule in the set of rules in the rule based expert system;
 c) selecting a rule with the lowest dependency from the set of rules in the rule based expert system;
 d) firing the rule in the rule based expert system;
 e) excluding the rule from the set of rules in the rule based expert system and
 f) repeating steps (c)-(e) in the rule based expert system until the set of rules is empty and the firing priority for the set of rules has been determined using the rule based expert system.

12. The method of claim 11 further comprising the step of checking consistencies between a plurality of rules in the set of rules.

13. The method of claim 11 wherein the step of determining is performed in response to an initial event.

14. A system for automatically executing a set of rules, the system comprising:
 a processor;
 means for determining if there are reciprocal dependencies between any two rules in the set of rules means for determining a level of dependency of each rule in the set of rules in a rule based expert system;
 means for selecting a rule with the lowest dependency from the set of rules, the means for selecting in communication with the means for determining in the rule based expert system;
 means for firing the rule, the means for firing in communication with the means for selecting in the rule based expert system; and
 means for excluding the rule from the set of rules, the means for excluding in communication with the means for firing in the rule based expert system, wherein the processor determines a firing priority for the set of rules in the rule based expert system.

15. The system of claim 14 further comprising means for checking consistencies between a plurality of rules in the set of rules.

16. The system of claim 14 further comprising means for storing the levels of dependencies of each rule.

17. A system for automatically executing a set of rules, the system comprising:
 a processor programmed to determine the firing priority for the set of rules;
 a loop detecting module in communication with a rule dependency determining module wherein the loop detecting module determines if there are reciprocal dependencies between any two rules in the set of rules in a rule based expert system;
 a rule dependency determining module in the rule based expert system;
 a rule selection module in communication with the rule dependency determining module in the rule based expert system;
 a rule firing module in communication with the rule selection module in the rule based expert system; and
 a rule exclusion module in communication with the rule firing module in the rule based expert system,
 wherein the rule dependency determining module determines a level of dependency of each rule in the set of rules,
 wherein the rule selection module selects a rule with the lowest dependency from the set of rules,
 wherein the rule firing module fires the selected rule in the rule based expert system, and
 wherein the rule exclusion module excludes the selected rule from the set of rules.

18. The system of claim 17 further comprising a consistency checking module in communication with a rule dependency determining module wherein the consistency checking module checks for consistencies between a plurality of rules in the set of rules.

19. The system of claim 17 further comprising a memory unit in communication with a rule dependency determining module for storing the levels of dependencies of each rule.

* * * * *